United States Patent Office 2,743,305
Patented Apr. 24, 1956

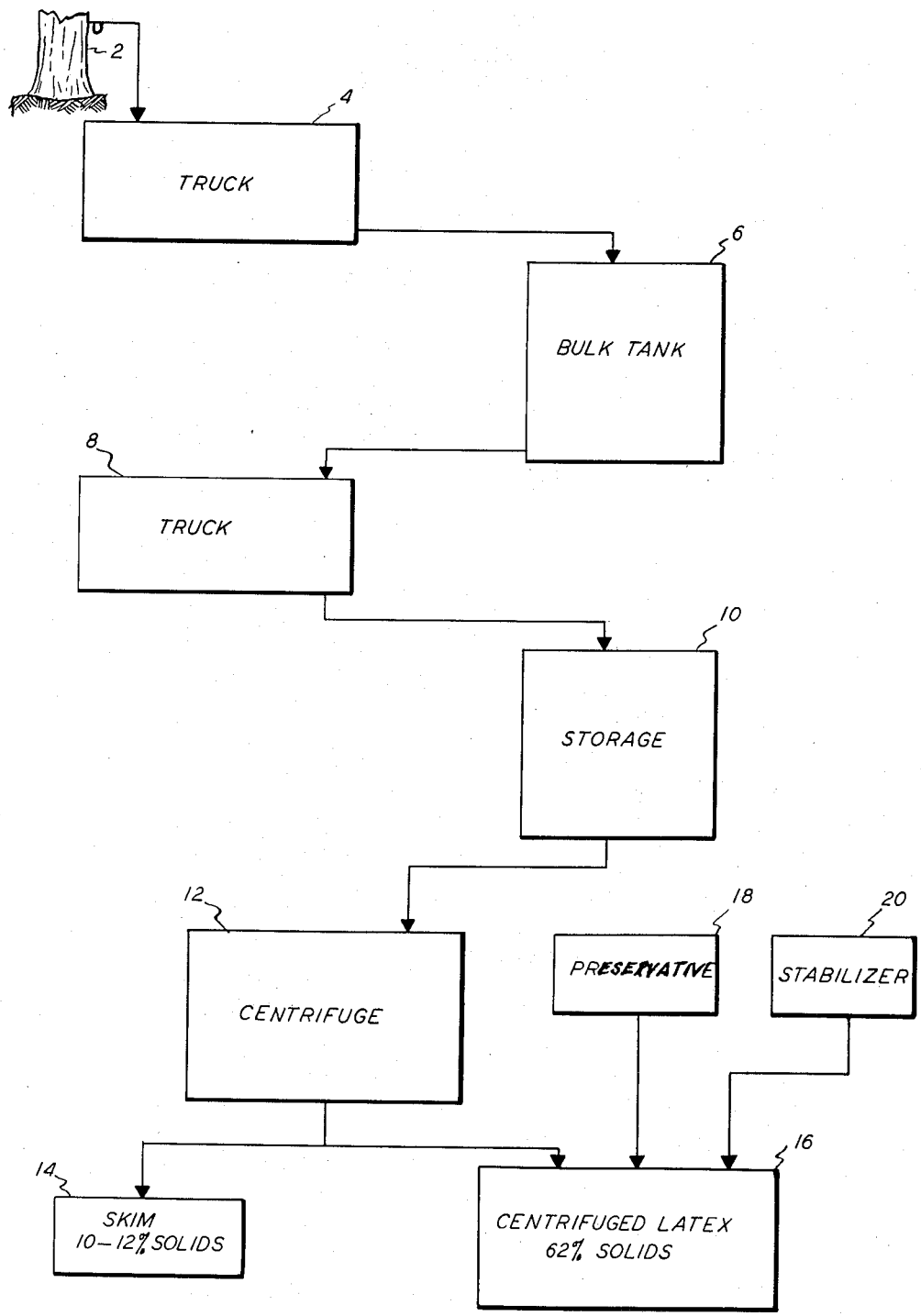

2,743,305
METHOD OF PRESERVING LATEX

Henry B. Townsend, Cochituate, Mass., assignor to General Latex & Chemical Corporation, Cambridge, Mass., a corporation of Massachusetts Application January 9, 1953, Serial No. 330,532

10 Claims. (Cl. 260—815)

This invention relates to improvements in natural rubber latex and more particularly such latex in the liquid form in which it is obtained from rubber trees and which is required to be held in a preserved state until ready for subsequent processing, shipment, or use.

It is now customary to add a preservative to freshly gathered latex, so-called "field latex," in order to maintain the latex dispersion in a satisfactory condition, and the principal agent used for this purpose is ammonia. Certain objections are present in connection with the use of this compound; one is the odor. Therefore, a latex with low ammonia content is always commercially desirable. For some latex uses, ammonia has to be neutralized as, for example, with formaldehyde or fatty acids, and in other cases ammonia is removed by aeration or blowing. As normally used ammonia generally acts as a bactericide and also favorably influences mechanical stability, i. e., resistance to frictional coagulation, probably due to formation of ammonium soaps. However, there is in connection with the use of ammonia a definite tendency for hydrolysis of the non-rubber constituents to take place in the latex and for acidic compounds to be formed, with time, and thus reduce the quality of the product. Such changes have been observed by electrometric titration with potassium hydroxide, referred to as the KOH number.

It is an object of the present invention to provide an improved latex product of the preserved type indicated, in which a substantial part of the ammonia heretofore required may be eliminated. Another object is to retard the occurrence of hydrolysis, and to limit the formation of acidic constituents noted above while, at the same time, maintaining a suitable preserving or bactericide effect. Another object is to devise a substitute preservative agent which may, in some cases at least, be employed to take the place of ammonia entirely. Still another object of the invention is to provide improved methods of preserving latex, either in the form of field latex as obtained from the rubber tree or in the form of a concentrated latex which is processed from the field product after transport to the concentrating plant. Another object is to avoid the necessity of chemically or mechanically removing unwanted ammonia.

These and other objects and novel features will be more fully understood and appreciated from the following description of a preferred embodiment of the invention selected for purposes of illustration and shown in the accompanying drawing, in which the figure is a block diagram illustrating steps in a typical process of gathering and treating field latex, and further indicating one point at which the novel preserving steps of the invention may be conveniently carried out.

Referring more in detail to the drawing, fresh latex from the tapping cups, as it is gathered at the rubber tree 2, is customarily collected in a tank truck 4, or other suitable vehicle, by means of which it is conveyed to a large container 6 located on the rubber plantation and usually referred to as the "bulking tank." Here it is necessary to start preservation of the latex, and for this purpose it is customary to add a small quantity of anhydrous ammonia. From the bulking tank 6 the liquid latex is drawn off and transported by trucks 8, for example, to another storage station 10. At this point the latex normally is of relatively low ammonia content such, for example, as a .4% on the aqueous phase.

It is further customary to draw off this low ammonia content latex and subject it to the action of a concentration method, e. g., centrifuge 12. Such a centrifuge separates the latex into a skim 14 having a solid content of from 6% to 12% and a remainder concentrate 16 having a solid content of approximately 62%. To the latex concentrate 16 it is then necessary to introduce an additional amount of anhydrous ammonia which, for example, brings the ammonia content up to about .6% on the total latex weight which is the same as 1.6% on the aqueous phase.

In accordance with the invention I provide an improved preserved latex product in which a substitute for ammonia is employed to obtain a suitable preserving action. One desirable form of latex product of the invention is produced by taking latex in the form of the concentrate 16 illustrated in the drawing and incorporating in this concentrate, in place of the additional amount of ammonia usually added here, two separate chemical agents which, in the presence of one another, constitute novel preservative and stabilizer means. The preservative and stabilizer agents are indicated diagrammatically in the drawing by the numerals 18 and 20.

In the first instance I have discovered that certain metal salts are capable of functioning as a bactericide for killing bacteria in latex and thus acting as a preservative. A principal example of such a salt is a compound commonly known as zinc dimethyldithiocarbamate having the following formula:

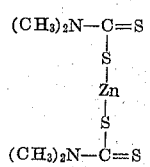

I also find that there is a very definite tendency for a compound of this nature to reduce the mechanical stability value of the latex to an undesirable degree and in order for the metal salt to be successfully used it must be employed in the presence of a compound which is capable of protectively holding the latex particles in a properly dispersed state while, at the same time, allowing the metal salt to exercise its preservative action to a satisfactory extent.

It should be understood in this connection that the matter of preserving latex, as conventionally carried out, must be a carefully controlled process which is at all times subject to a series of standardized tests. The action of the usual ammonia, among other things, is one of producing resistance to frictional coagulation of the latex. The ability of the ammonia to do this is referred to in terms of "Mechanical Stability" of the product and is rated in accordance with a well known mechanical stability test by the American Society for Testing Materials and recognized throughout the industry (A. S. T. M. Standards 1949, D 1076–49 T). There are also certain other important tests relating to the odor, KOH number, and others, which must be met as characteristic of satisfactorily preserved latex.

With a realization in mind of the fact that substantially all of these standard A. S. T. M. requirements must be met in connection with any preserving action which can be carried out, I have further discovered that, in conjunction with the use of the metal salt noted above, a suitable protective action for preventing an undesirable drop in mechanical stability can be accomplished by the use of certain anionic and non-ionic compounds of the class commonly referred to as "surface active agents." Such compounds are compatible with latex dispersions which are anionic in nature.

Such surface active materials may be soaps or detergents. Soap, such as ammonium oleate or other reaction products of fatty acids and alkalis may be employed. I may also employ as a surface active material certain other soap-like compounds of the detergent class such, for example, as a compound comprising a sodium salt of sulphate monoesters of a mixture of higher fatty acids consisting chiefly of lauryl and myristyl derivatives. All of these are classed as anionic. Another instance of a suitable surface active material is a non-ionic compound, such as an aqueous solution of C-cetyl betaine. It may also be desired to use a mixture of anionic and non-ionic compounds.

As illustrative of specific substances and amounts used in providing a preserving material for a latex dispersion in accordance with the invention, the following is cited:

A dispersion of preservative material was prepared by ball milling for a period of 36 hours, a mixture consisting of 200 parts of zinc dimethyldithiocarbamate, 10 parts of a dispersing agent, such as alkyl aryl sulphonate and 190 parts of water.

From a bulk lot of concentrated latex drawn fresh from separating machines, such as are indicated in the drawing by the numeral 12, sample bottles were filled and sealed, having measured percentages of the zinc dimethyldithiocarbamate dispersion noted above and ammonia as follows:

*Table I*

The percentages referred to herein relate to 62% latex solids.

| Control | Zinc Dimethyl Dithiocarbamate. | 0.00% on total latex. | Ammonia | 0.80% total latex; 2.1% on aqueous phase. |
|---|---|---|---|---|
| A | do | 0.05% on total latex. | do | 0.27 total latex; .8 on aqueous phase. |
| B | do | 0.10% on total latex. | do | Do. |
| C | do | 0.15% on total latex. | do | Do. |
| D | do | 0.20% on total latex. | do | Do. |
| E | do | 0.25% on total latex. | do | Do. |

After being allowed to stand for a period of three days, portions of each of these samples were analyzed and gave the following results:

*Table II*

| Sample | KOH No. | Mechanical Stability A. S. T. M. in secs. |
|---|---|---|
| Control | 0.323 | 600 |
| A | 0.196 | 200 |
| B | 0.191 | 200 |
| C | 0.228 | 200 |
| D | 0.190 | 200 |
| E | 0.232 | 200 |

Portions of each of the samples tested were then treated with a surface active agent consisting of a 15% solution of ammonium oleate in an amount sufficient to produce a concentration of 0.2% ammonium oleate on the aqueous phase. These samples were resealed and allowed to stand for a period of approximately 16 days, together with the original samples containing no oleate. Both the oleate series and the original series were then tested and gave the following results:

*Table III*

| Sample | KOH No. | Mechanical Stability A. S. T. M. in secs. |
|---|---|---|
| Control | 0.516 | 1,200 |
| A | 0.336 | 500 |
| B | 0.364 | 500 |
| C | 0.350 | 500 |
| D | 0.370 | 500 |
| E | 0.340 | 500 |

*Table IV.—Oleate series*

| Sample | KOH No. | Mechanical Stability A. S. T. M. in secs. |
|---|---|---|
| A | 0.413 | 2,500 |
| B | 0.415 | 2,000 |
| C | 0.413 | 2,000 |
| D | 0.410 | 2,000 |
| E | 0.409 | 2,000 |

Study of this data shows that the zinc dimethyldithiocarbamate produces lower KOH values than ammonia alone (Table II), and that the rate of increase of this value with storage is less than with ammonia alone (Table III). This observation leads to the conclusion that the metal salt additive has repressed hydrolysis substantially better than ammonia alone and that in the particular latex tested .05% of additive was essentially as effective as .25%.

These data also indicate that the mechanical stability is lowered in the zinc salt samples (Tables II and III) either due to a destabilized influence of the salt or by reason of the fact that ammonia content was at a lower level. This deficiency, however, from whatever cause, was rectified by the addition of ammonium oleate (Table IV) so that the samples with the metal were then greater than the control of the same age (Table III).

In other tests of a somewhat similar nature run on samples of this type from time to time, it was observed that by the use of a soap or surface active material with the metal salt, it was possible to prevent the formation of obnoxious and putrefactive odors of a troublesome degree.

From the foregoing results it is pointed out that there is ample evidence to show that by the combined preservative and stabilizing means of the invention it is possible to carry out an excellent preserving action with concentrated latex with an appreciable control of the formation of acidic constituents which are derived from non-rubber materials and which would indicate that hydrolysis of non-rubber constituents was retarded or checked. The tests described further provide evidence of the fact that it is possible by the method of the invention to hold a very small ammonia content latex product in a satisfactorily preserved condition for a substantial period of time such as has not heretofore been realized under similar conditions.

It should be understood that the invention is not intended to be limited to the precise materials and procedures noted above which have been set forth as exemplary of one suitable procedure for successfully embodying the invention. Thus I may desire to utilize the preservative and stabilizing means of the invention in modified ways. For example, I may employ compounds of the class of those indicated above in preserving latex freshly drawn, or field latex, of the type noted in the drawing as being collected at the bulking tank 6. This may be done either in conjunction with a small quantity of ammonia, such as is conventionally employed, or in some cases it may be desired to eliminate entirely the small percentage of ammonia and utilize the reagents of the invention as the sole preserving agency.

As alternatives for zinc dithiocarbamate compounds homologues of the dithiocarbamate may be utilized as, for example, zinc diethyl dithiocarbamate, zinc dibutyl dithiocarbamate, and the like. The procedures shown relate to latex concentrated by centrifugal means. Other methods of concentration, such as exaporation, creaming, electrodecantation, etc. are considered equivalents.

The resulting product of the invention is especially useful for the manufacture of latex foam since there is accomplished a reduction of ammonia which operates to save costs in connection with the operation of removing ammonia from conventional preserved latex by aerating. Also, the preservative zinc dimethyldithiocarbamate, or any one of its homologues, is one of the common vulcanizing agents used in connection with so-called "maturing steps" in preparing latex for latex foam. Thus its original presence in the latex cannot produce any troublesome problem in this end use.

While I have shown and described further embodiments of the invention, various other changes and modifications may be carried out in keeping with the scope of the invention as defined by the appended claims.

Having thus described my invention, what I desire to claim as new is:

1. A preserved natural rubber latex concentrate composition of approximately 62% solids contents consisting of latex, a zinc diloweralkyl dithio carbamate preservative, a surface active agent stabilizer selected from a group consisting of anionic and non-ionic surface active agents, and ammonia, said ammonia being present in amount which of itself would not preserve the latex.

2. The composition of claim 1 wherein the zinc diloweralkyl dithio carbamate is zinc dimethyl dithio carbamate.

3. The composition of claim 1 wherein the surface active agent is ammonium oleate.

4. The composition of claim 1 wherein the surface active agent is C-cetyl betaine.

5. A preserved natural rubber latex concentrate composition of approximately 62% solids content consisting of latex, approximately .05% to .25% zinc dimethyl dithio carbamate on the total latex, a stabilizing amount of not over .2% on the aqueous phase of ammonium oleate, and ammonia, said ammonia being present in amount which of itself would not preserve the latex.

6. A method of preserving natural rubber latex from bacterial and enzyme degradation which consists of adding thereto a three component system consisting of (a) a zinc diloweralkyl dithio carbamate and (b) a surface active agent stabilizer selected from the group consisting of anionic and non-ionic surface active agents and (c) ammonia, in amount which of itself would not preserve the latex.

7. A method of preserving natural rubber latex concentrate of approximately 62% solids content from bacterial and enzyme degradation which consists in adding thereto a three component system consisting of (a) a zinc diloweralkyl dithio carbamate and (b) a surface active agent stabilizer selected from the group consisting of anionic and non-ionic surface active agents and (c) ammonia, in amount which of itself would not preserve the latex.

8. The method of claim 7 wherein the zinc diloweralkyl dithio carbamate is zinc dimethyl dithio carbamate.

9. The method of claim 7 wherein the surface active agent is ammonium oleate.

10. The method of claim 7 wherein the surface active agent is C-cetyl betaine.

References Cited in the file of this patent
UNITED STATES PATENTS

| | | |
|---|---|---|
| 2,001,791 | Linscott | May 21, 1935 |
| 2,126,275 | Ogilby | Aug. 9, 1938 |